(12) United States Patent
Kemppinen et al.

(10) Patent No.: US 10,466,743 B2
(45) Date of Patent: *Nov. 5, 2019

(54) DISPLAY APPARATUS

(71) Applicant: Nokia Technologies Oy, Espoo (FI)

(72) Inventors: Pasi Kemppinen, Tampere (FI); Mikko Jyrkinen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/358,105

(22) Filed: Mar. 19, 2019

(65) Prior Publication Data
US 2019/0212777 A1 Jul. 11, 2019

Related U.S. Application Data

(63) Continuation of application No. 15/651,556, filed on Jul. 17, 2017, now Pat. No. 10,234,901, which is a continuation of application No. 14/417,701, filed as application No. PCT/IB2012/054093 on Aug. 10, 2012, now Pat. No. 9,710,018.

(51) Int. Cl.
| | |
|---|---|
| *G06F 1/16* | (2006.01) |
| *H05K 5/00* | (2006.01) |
| *H05K 7/00* | (2006.01) |
| *H04M 1/02* | (2006.01) |
| *G06F 3/041* | (2006.01) |
| *G06F 3/01* | (2006.01) |

(52) U.S. Cl.
CPC .......... *G06F 1/1637* (2013.01); *G06F 3/016* (2013.01); *G06F 3/041* (2013.01); *H04M 1/0266* (2013.01); *G06F 2203/04102* (2013.01)

(58) Field of Classification Search
CPC ...... G06F 1/1637; G06F 1/1643; G06F 3/016; G06F 3/041; H04M 1/0266
USPC .............. 361/679.21–679.3, 679.55, 679.56; 455/575.1–575.9; 349/56–60
See application file for complete search history.

(56) References Cited

U.S. PATENT DOCUMENTS

| | | | |
|---|---|---|---|
| 4,950,072 A | 8/1990 | Honda | |
| 6,064,453 A * | 5/2000 | Inubushi | G02F 1/133308 349/58 |
| 7,151,837 B2 * | 12/2006 | Bank | H04R 7/045 381/190 |
| 7,750,252 B2 | 7/2010 | Colby et al. | |
| 8,243,426 B2 * | 8/2012 | Chen | G02B 1/005 361/679.21 |
| 8,536,978 B2 * | 9/2013 | Coggill | G06F 21/36 340/5.54 |

(Continued)

FOREIGN PATENT DOCUMENTS

| | | |
|---|---|---|
| EP | 2862040 A1 | 4/2015 |
| WO | WO-03049493 A1 | 6/2003 |
| WO | WO-2013/186597 A1 | 12/2013 |

*Primary Examiner* — Anthony M Haughton
(74) *Attorney, Agent, or Firm* — Harrington & Smith

(57) ABSTRACT

An apparatus comprising a suspension unit comprising: a first part coupled to a display assembly; a second part coupled to an apparatus body; and a suspension part coupled at one end to the first part and at another end to the second part, configured to suspend the first part relative to the second part by the bending force of the suspension part, such that the display assembly is movable relative to the apparatus body.

17 Claims, 12 Drawing Sheets

(56) References Cited

U.S. PATENT DOCUMENTS

| | | | |
|---|---|---|---|
| 8,611,077 B2* | 12/2013 | Sanford | G06F 1/1626 |
| | | | 361/679.21 |
| 8,638,549 B2* | 1/2014 | Garelli | G06F 1/1615 |
| | | | 361/679.26 |
| 9,232,185 B2 | 1/2016 | Graham et al. | |
| 2003/0059069 A1 | 3/2003 | Bank et al. | |
| 2005/0285991 A1* | 12/2005 | Yamazaki | G02F 1/133308 |
| | | | 349/58 |
| 2007/0236894 A1 | 10/2007 | Colby et al. | |
| 2009/0244013 A1* | 10/2009 | Eldershaw | G06F 3/041 |
| | | | 345/173 |
| 2011/0164372 A1 | 7/2011 | McClure et al. | |
| 2012/0149437 A1 | 6/2012 | Zurek et al. | |
| 2014/0307370 A1* | 10/2014 | Zadesky | H04M 1/0252 |
| | | | 361/679.01 |
| 2018/0092229 A1* | 3/2018 | Zadesky | H04M 1/0252 |

\* cited by examiner

DISPLAY APPARATUS

CROSS REFERENCE TO RELATED APPLICATION

This is a continuation patent application of U.S. patent application Ser. No. 15/651,556 filed on Jul. 17, 2017, which is a continuation patent application of U.S. patent application Ser. No. 14/417,701 filed on Jan. 27, 2015, which is a national stage application of PCT Application No. PCT/IB2012/054093 filed Aug. 10, 2012, which are all hereby incorporated by reference in their entireties.

FIELD

The present invention relates to display apparatus. The invention further relates to, but is not limited to, display apparatus for use in mobile devices.

BACKGROUND

Many portable devices, for example mobile telephones, are equipped with a display such as a glass or plastic display window for providing information to the user. Furthermore such display windows are now commonly used as touch sensitive inputs. In some cases the apparatus can provide a visual feedback and audible feedback when recording a touch input. In some further devices the audible feedback is augmented with a vibrating motor used to provide a haptic feedback so the user knows that the device has accepted the input.

The display or display assembly is typically rigidly fixed to the device chassis or cover. There has been discussion recently with regards to enabling the display to float relative to the cover or chassis of the device. By allowing the display to float relative to the cover or chassis of the device the display can move in such a way that the user can experience a haptic or tactile experience when touching the display. Furthermore by enabling the display to move relative to the cover or chassis of the device the display can be configured to generate acoustic energy suitable for the reproduction of audio signals.

Current designs for practical floating display assembly have proven to be difficult to implement. An example implementation uses a membrane suspension which suspends the display assembly relative to the static portion formed by the chassis/cover by a flexible membrane. The flexible membrane is bonded at one end to the display assembly and to the opposite end to the static portion enabling the display assembly to move relative to the static portion.

STATEMENT

According to an aspect, there is provided an apparatus comprising a suspension unit comprising: a first part coupled to a display assembly; a second part coupled to an apparatus body; and a suspension part coupled at one end to the first part and at another end to the second part, configured to suspend the first part relative to the second part by the bending force of the suspension part, such that the display assembly is movable relative to the apparatus body.

The first part and the suspension part may be integrally formed.

The second part and the suspension part may be integrally formed.

The first part may comprise a support ring configured to support the display assembly.

The first part may comprise a display frame substantially surrounding the display assembly and coupled to a front window of the display assembly.

The first part may further comprise a sheet coupled to the display frame, wherein the sheet is configured to transfer a force from an actuator to the display, such that the display is configured to move in at least one axis.

The sheet may be formed with a stop part configured to mechanically limit the motion of the display in the at least one axis.

The second part may be configured to locate the display suspension within an apparatus body cover.

The second part may comprise at least one flange configured to co-operate with an apparatus body cover lip to locate the display suspension within the apparatus body cover.

The second part may comprise at least one flange configured to co-operate with an apparatus body chassis to locate the display suspension within the apparatus body cover.

The second part may comprise at least one hole configured to accept a fixing element for fixing the second part within the apparatus body cover.

The second part may comprise a snap configured to co-operate with an apparatus body chassis to locate the display suspension within the apparatus body cover.

The suspension part may be a resilient folded surface, configured to suspend the first part relative to the second part by the bending force of the resilient folded surface.

The resilient folded surface may be at least one of: a urethane layer; a plastic layer; a rubber layer; and a silicone layer.

The resilient folded surface part may be configured to be compressible in the direction substantially perpendicular to at least one fold in the folded surface, such that the dimension in the compressible direction permits the display suspension to be inserted within the apparatus body.

The resilient folded surface part when inserted within the apparatus body may be configured to relax in the direction substantially perpendicular to the at least one fold in the folded surface, such that the dimension in the compressible direction lengthens to permit the display suspension to be located within the apparatus body by the second part.

The second part may comprise at least one hole configured to accept a screw, wherein the screw can be turned to move the display assembly relative to the apparatus body so to locating the second part within the apparatus body cover.

The apparatus may further comprise a static display assembly comprising the display generator configured to be substantially rigidly coupled to the apparatus body, wherein the display assembly comprises a display cover window configured to at least partially cover and physically protect the display generator.

The display assembly may be an audio display, configured to generate at least one acoustic sound by the motion of the display assembly movable relative to the apparatus body.

The suspension part may be coupled at one end to the first part and at an opposite end to the second part.

According to third aspect there is provided an apparatus comprising a suspension unit comprising: a first means coupled to a display assembly; a second means coupled to an apparatus body; and a suspension means coupled at one end to the first part and at another end to the second part, configured to suspend the first part relative to the second part by the bending force of the suspension part, such that the display assembly is movable relative to the apparatus body.

The first means and the suspension means may be integrally formed.

The second means and the suspension means may be integrally formed.

The first means may comprise support means for supporting the display assembly.

The first means may comprise framing means substantially surrounding the display assembly and coupled to a front window of the display assembly.

The first means may further comprise force transfer means coupled to the display frame, wherein the force transfer means is configured to transfer a force from an actuator to the display, such that the display is configured to move in at least one axis.

The force transfer means may be formed with a stop means for mechanically limiting the motion of the display in the at least one axis.

The second means may be configured to locate the display suspension within an apparatus body cover.

The second means may comprise a locating means for co-operating with an apparatus body cover lip to locate the display suspension within the apparatus body cover.

The second means may comprise a locating means for co-operating with an apparatus body chassis to locate the display suspension within the apparatus body cover.

The second means may comprise at least one hole configured to accept a fixing means for fixing the second means within the apparatus body cover.

The second means may comprise a snap configured to co-operate with an apparatus body chassis to locate the display suspension within the apparatus body cover.

The suspension means may be a resilient folded surface, configured to suspend the first means relative to the second means by the bending force of the resilient folded surface.

The resilient folded surface may be at least one of: a urethane layer; a plastic layer; a rubber layer; and a silicone layer.

The resilient folded surface means may be configured to be compressible in the direction substantially perpendicular to at least one fold in the folded surface, such that the dimension in the compressible direction permits the display suspension to be inserted within the apparatus body.

The resilient folded surface means when inserted within the apparatus body may be configured to relax in the direction substantially perpendicular to the at least one fold in the folded surface, such that the dimension in the compressible direction lengthens to permit the display suspension to be located within the apparatus body by the second means.

The second means may comprise at least one hole configured to accept a screw, wherein the screw can be turned to move the display assembly relative to the apparatus body so to locating the second means within the apparatus body cover.

The apparatus may further comprise a static display assembly comprising the display generator configured to be substantially rigidly coupled to the apparatus body, wherein the display assembly comprises a display cover window configured to at least partially cover and physically protect the display generator.

The display assembly may be an audio display, configured to generate at least one acoustic sound by the motion of the display assembly movable relative to the apparatus body.

The suspension means may be coupled at one end to the first means and at an opposite end to the second means.

According to a third aspect there is provided a method comprising providing an apparatus comprising a suspension unit comprising: coupling a first part of the suspension unit to a display assembly; coupling a second part of the suspension unit to an apparatus body; and coupling a suspension part of the suspension unit at one end to the first part of the suspension unit and at another end of the suspension unit to the second part, and suspending the first part relative to the second part by the bending force of the suspension part, such that the display assembly is movable relative to the apparatus body.

An electronic device may comprise apparatus as described herein.

SUMMARY OF FIGURES

For better understanding of the present invention, reference will now be made by way of example to the accompanying drawings in which.

DESCRIPTION OF EXAMPLE EMBODIMENTS

The application describes apparatus and methods capable of generating, encoding, storing, transmitting and outputting tactile and acoustic outputs using a touch screen device.

Figure 1:
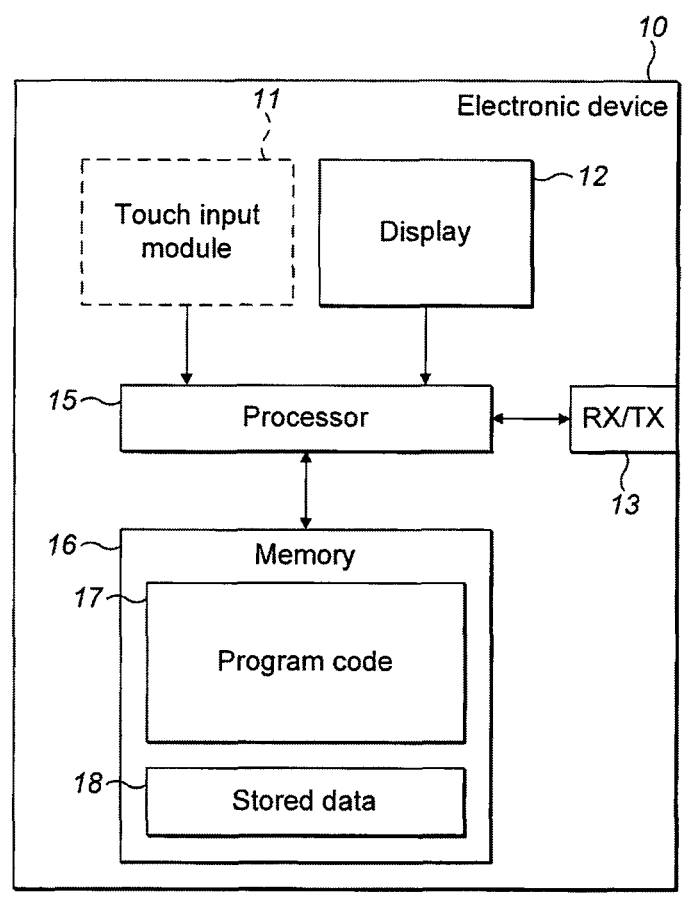
FIG. 1 shows schematically an apparatus suitable for employing some embodiments.

With respect to FIG. 1 a schematic block diagram of an example electronic device 10 or apparatus on which embodiments of the application can be implemented. The apparatus 10 is such embodiments configured to provide a display.

The apparatus 10 is in some embodiments a mobile terminal, mobile phone or user equipment for operation in a wireless communication system. In other embodiments, the apparatus is any suitable electronic device configured to provide an image display, such as for example a digital camera, a portable audio player (mp3 player), a portable video player (mp4 player). In other embodiments the apparatus can be any suitable electronic device with touch interface (which may or may not display information) such as a touch-screen or touch-pad configured to provide feedback when the touch-screen or touch-pad is touched. For example in some embodiments the touch-pad can be a touch-sensitive keypad which can in some embodiments have no markings on it and in other embodiments have physical markings or designations on the front window. The user can in such embodiments be notified of where to touch by a physical identifier—such as a raised profile, or a printed layer which can be illuminated by a light guide.

The apparatus 10 comprises a touch input module or user interface 11, which is linked to a processor 15. The processor 15 is further linked to a display 12. The processor 15 is further linked to a transceiver (TX/RX) 13 and to a memory 16.

In some embodiments, the touch input module 11 and/or the display 12 are separate or separable from the electronic device and the processor receives signals from the touch input module 11 and/or transmits and signals to the display 12 via the transceiver 13 or another suitable interface. Furthermore in some embodiments the touch input module 11 and display 12 are parts of the same component. In such embodiments the touch interface module 11 and display 12 can be referred to as the display part or touch display part.

The processor 15 can in some embodiments be configured to execute various program codes. The implemented program codes, in some embodiments can comprise such routines as touch processing, input simulation, or tactile effect simulation code where the touch input module inputs are detected and processed, effect feedback signal generation where electrical signals are generated which when passed to a transducer can generate tactile or haptic feedback to the user of the apparatus, or actuator processing configured to generate an actuator signal for driving an actuator. The implemented program codes can in some embodiments be stored for example in the memory 16 and specifically within a program code section 17 of the memory 16 for retrieval by the processor 15 whenever needed. The memory 15 in some embodiments can further provide a section 18 for storing data, for example data that has been processed in accordance with the application, for example pseudo-audio signal data.

The touch input module 11 can in some embodiments implement any suitable touch screen interface technology. For example in some embodiments the touch screen interface can comprise a capacitive sensor configured to be sensitive to the presence of a finger above or on the touch screen interface. The capacitive sensor can comprise an insulator (for example glass or plastic), coated with a transparent conductor (for example indium tin oxide—ITO). As the human body is also a conductor, touching the surface of the screen results in a distortion of the local electrostatic field, measurable as a change in capacitance. Any suitable technology may be used to determine the location of the touch. The location can be passed to the processor which may calculate how the user's touch relates to the device. The insulator protects the conductive layer from dirt, dust or residue from the finger.

In some other embodiments the touch input module can be a resistive sensor comprising of several layers of which two are thin, metallic, electrically conductive layers separated by a narrow gap. When an object, such as a finger, presses down on a point on the panel's outer surface the two metallic layers become connected at that point: the panel then behaves as a pair of voltage dividers with connected outputs. This physical change therefore causes a change in the electrical current which is registered as a touch event and sent to the processor for processing.

In some other embodiments the touch input module can further determine a touch using technologies such as visual detection for example a camera either located below the surface or over the surface detecting the position of the finger or touching object, projected capacitance detection, infra-red detection, surface acoustic wave detection, dispersive signal technology, and acoustic pulse recognition. In some embodiments it would be understood that 'touch' can be defined by both physical contact and 'hover touch' where there is no physical contact with the sensor but the object located in close proximity with the sensor has an effect on the sensor.

The apparatus 10 can in some embodiments be capable of implementing processing techniques at least partially in hardware, in other words the processing carried out by the processor 15 may be implemented at least partially in hardware without the need of software or firmware to operate the hardware.

The transceiver 13 in some embodiments enables communication with other electronic devices, for example in some embodiments via a wireless communication network.

The display 12 may comprise any suitable display technology. For example the display element can be located below the touch input module and project an image through the touch input module to be viewed by the user. The display 12 can employ any suitable display technology such as liquid crystal display (LCD), light emitting diodes (LED), organic light emitting diodes (OLED), plasma display cells, Field emission display (FED), surface-conduction electron-emitter displays (SED), and Electophoretic displays (also known as electronic paper, e-paper or electronic ink displays). In some embodiments the display 12 employs one of the display technologies projected using a light guide to the display window.

The concept of the embodiments described herein is to improve on the current display suspension configurations used to produce rigid and floating display assemblies. A floating display as described herein is a display assembly where the window (and in some situations the window and display) is allowed to move up and down (in other words movement perpendicular to the plane of the display). The window up and down motion can be configured to produce acoustic energy suitable for reproducing audio signals and also be suitable for producing haptic or tactile feedback.

It would be understood that the design and engineering of the suspension of the display assembly (in other words how to make the window movable) can be problematic in terms of mechanical and design considerations. For example the suspension should be durable, nice looking and permit an acoustically good signal to be produced from the vibration of the window or display element.

As has been discussed previously a floating display suspension proposal is the membrane suspension where a flexible membrane is located at least partially around the periphery of the display assembly and partially around (typically underneath) the cover or casing edge. The elasticity of the membrane as it stretches (and relaxes) forms a flexible interface between the display assembly and the cover.

Current suspension concepts have proven difficult to engineer. To reduce the 'dead' area surrounding a display requires a suspension with a small operating width. The small or narrow width suspension can then lead to difficulties in product assembly as the display assembly with suspension is fitted to the apparatus. The concept behind the embodiments described herein is therefore a suspension which uses a bellows or folded surface (pleated) flexible material at least partially surrounding the moving window assembly and configured such that the suspension force is generated by a bending motion of the suspension surface. In the embodiments described herein the bellows or folded region of the suspension can be designed to be sufficiently narrow (for example approximately 1 mm wide).

The bellows suspension as described herein can be configured such that the fabrication of the apparatus within which the display assembly is to be fixed can be easily achieved even within a unibody type cover (a cover which substantially is a single piece of material rather than being formed from various sub-cover assemblies). For example it can be shown to be possible to use such a bellows suspension in a unibody type cover or casing, where squeezing the bellows or pleated suspension, narrows the length dimension of the assembly and permits the insertion of the assembly at the opposite side. Unibody construction is particularly useful in constructing good quality apparatus as the cover can have fewer holes and leaks and therefore a lower probability of dust or foreign particle penetration. Furthermore a unibody cover or case acoustical properties is generally easier to tune. A bellows suspension further assists the forming of a well sealed construction between the front window (or glass) and the cover (body or casing) of the apparatus.

A further advantage of the bellows or pleated suspension arrangement as described herein is that it permits a narrower display dead band (the area surrounding the display which is not capable of displaying images). This permits designs where the display area to be close to the maximum surface face area, in other words the display is close to the apparatus edge.

Figure 2:
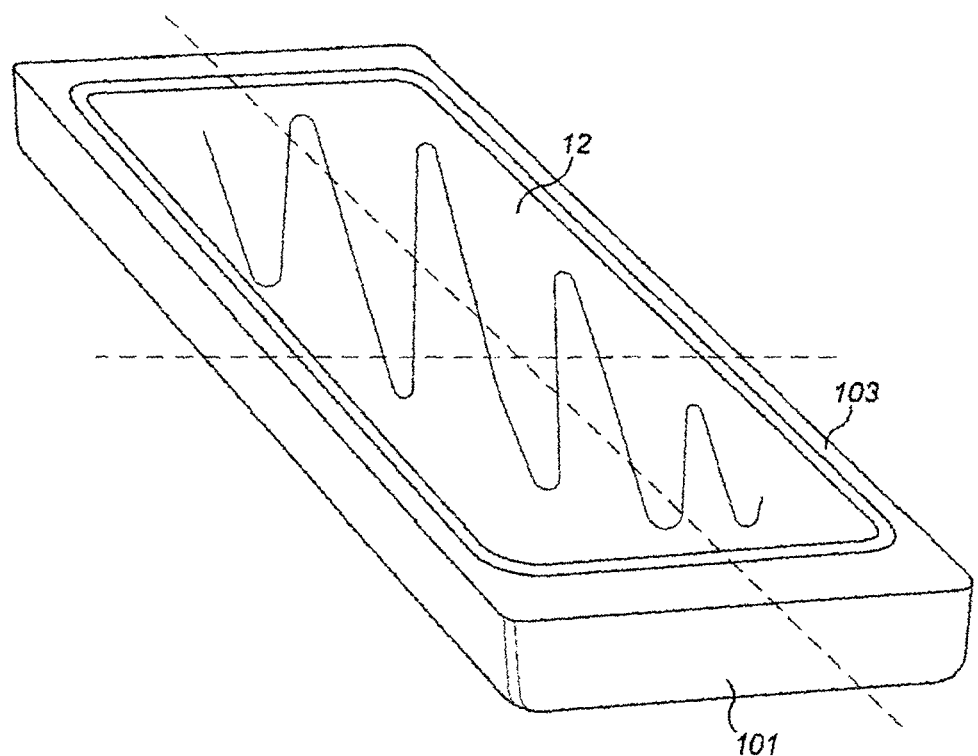
FIG. 2 shows schematically a three dimensional view of an example apparatus employing a bellows suspended floating display according to some embodiments.

With respect to FIG. 2 an orthogonal three-dimensional perspective view of an example mobile device or apparatus suitable for implementing embodiments of the application is shown. The apparatus comprises a cover or body 101 which in this example is a unibody type cover, in other words formed substantially from a single piece of material which is moulded or machined into the desired form. The cover 101 as shown in FIG. 2 is of the form of a rounded elongated cuboid where the length (y-dimension) of the form is greater than the height (x-dimension) which in turn is greater than the depth (z-dimension). The vertices of the cover are shown to be rounded. The shape or form of the casing as show in FIG. 2 and otherwise are examples only and that the cover can be any suitable shape.

The cover 101 shown in FIG. 2 has a single hole in the front face of the cover 101 suitable for receiving the display assembly and the suspension. The hole shown in FIG. 2 is rectangular with rounded corners however the shape of the hole can be any suitable shape for receiving the display assembly and suspension. The cover 101 can be constructed from any suitable material and can be further permitted to have further ports or holes in other faces for enabling additional input and outputs such as for example ports or buttons.

The apparatus further can comprise a display assembly 12. The display assembly 12 as described herein can be any suitable display technology. The display assembly can in some embodiments comprise a display and cover window or in some embodiments the cover window only operating over a static display component.

Furthermore the apparatus comprises a suspension component. In the embodiments described herein the suspension component is configured to suspend the display 12 relative to the cover or casing 101. Although it would be understood that the cover or casing 101 can in some embodiments be considered to part of the apparatus 'body' from which the display and/or display window is suspended. The suspension component can in some embodiments be a bellows or pleated material suspension. The bellows suspension 103 is shown in FIG. 2 surrounding the periphery of the display assembly 12.

Figure 3:
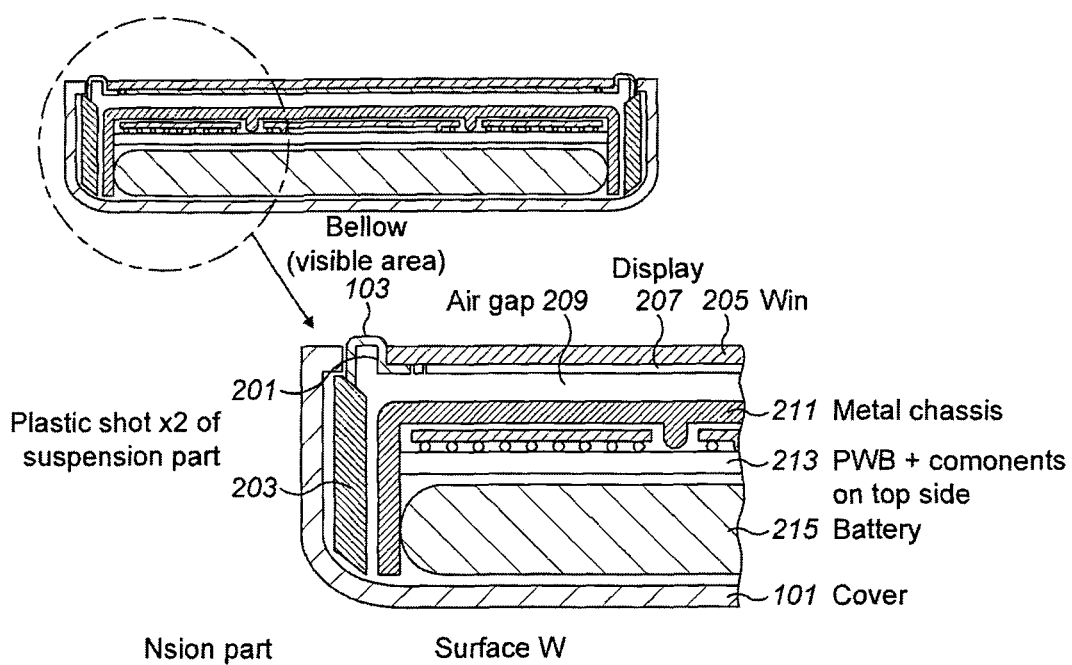
FIG. 3 shows schematically a cross-sectional detail view of the apparatus shown in FIG. 2 demonstrating the bellows suspension in situ.

With respect to FIG. 3 shows detailed cross-sectional views of the apparatus. The cross sectional view shows the cover 101 having a lower or rear rounded corner with a larger radius of curvature and an upper or front rounded corner with a sharper or smaller radius of curvature. The cover 101 front rounded corner then defines an upper or front lip region. The upper or front lip region can be seen as being the material which defines the unibody hole.

It would be understood that the apparatus can comprise internal components which can be located within the cover. These are shown in the examples and are discussed briefly. The internal components within the cover 101 can comprise components such as a battery 215, a printed wiring board (or in some embodiments a printed circuit board) with components located on at least one of the sides of the printed wiring board.

The printed wiring board 213 and battery 215 can furthermore be configured to be located within the cover by an internal chassis 211. The internal chassis 211, which in some embodiments is constructed from metal, can generate a rigid structure which locates the internal components of the apparatus and prevents the casing or cover 101 from flexing significantly. In some embodiments the cover 101 comprises mouldings or structures which can be configured to operate as the chassis 211.

In some embodiments the cover 101 and the internal chassis 211 can be designed to locate at least a first support part (or shot) of the bellows suspension.

The bellows suspension 301 comprises a first support part 203 (or shot) which can be a plastic or rigid structure. For example as shown in FIG. 3 the first support part 203 can comprise a rigid plastic component located between the outside of the chassis member 211 and the inside of the cover 101. In such embodiments the first support part 203 can be shaped such that it has a lip or tab which fits or matches the profile of the cover lip section such that when the suspension is inserted into the unibody hole the suspension is fixed vertically and thus cannot move freely in the up-down (z-dimension) direction, where the chassis and cover fix the suspension horizontally and thus prevent the first support part 203 from moving in the side-to-side directions (x and y-dimensions).

The bellows suspension 301 can further comprise a flexible folded surface part 103. The flexible folded surface part is configured to couple at one end the first support part 203 and couple at the other end the second support part 201 and be able to suspend the display by the bending forces within the flexible folding surface.

The bellows suspension as shown FIG. 3 is located at one end to the first support part 203 thus locating one end of the folded surface part 103 relative to the cover/chassis. In other words a first arm of the bellow is located relative to the static components of the apparatus.

The flexible folded surface part (bellows section) 103 comprises at least one fold or pleat. In the example shown in FIG. 3 the folded surface part comprises a first approximately 180 degree curved fold forming an n-fold (inverted u-fold) and a second 90 degree fold converting the vertical surface to a horizontal surface.

The bellows suspension further comprises a second support part 201 which is configured to be coupled to the flexible surface part and to the display assembly (in other words the dynamic or moving portion of the suspension). In the example shown in FIG. 4 the second support part 201 forms a pad on which the display window is located. The second support part 201 in some embodiments is formed from plastic and in some embodiments the same type of material as the first support part 203.

The second support part 203 in other words can in some embodiments form a frame which is coupled to the display assembly. For example as shown in FIG. 3 the second support part 203 forms a frame on which the window 205 layer can rest.

The display assembly as shown in FIG. 3 comprises a window 205 (or display window or glass) which can be a glass or other suitable toughened layer for physically protecting the display 207. The display assembly can further in some embodiments comprise a display 207, which is shown in FIG. 3 as coupled to the underside of the window 205.

The suspension of the window 205 and display 207 by the folded surface part 103 of the suspension is such that at rest (in other words with no additional force applied) there is an air gap 209 between the window assembly and the static portion of the apparatus such as shown by the chassis 211.

Figure 4:
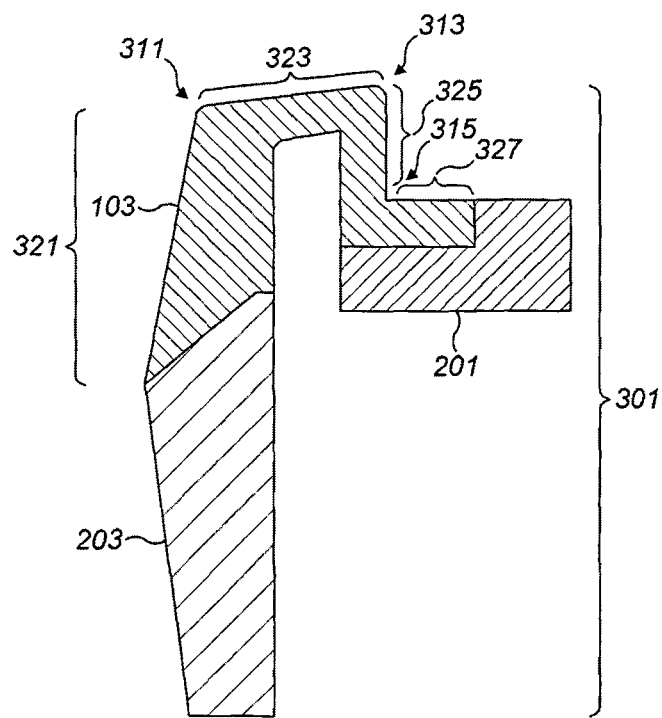
FIG. 4 shows schematically an example bellows suspension according to some embodiments.
Figure 5:
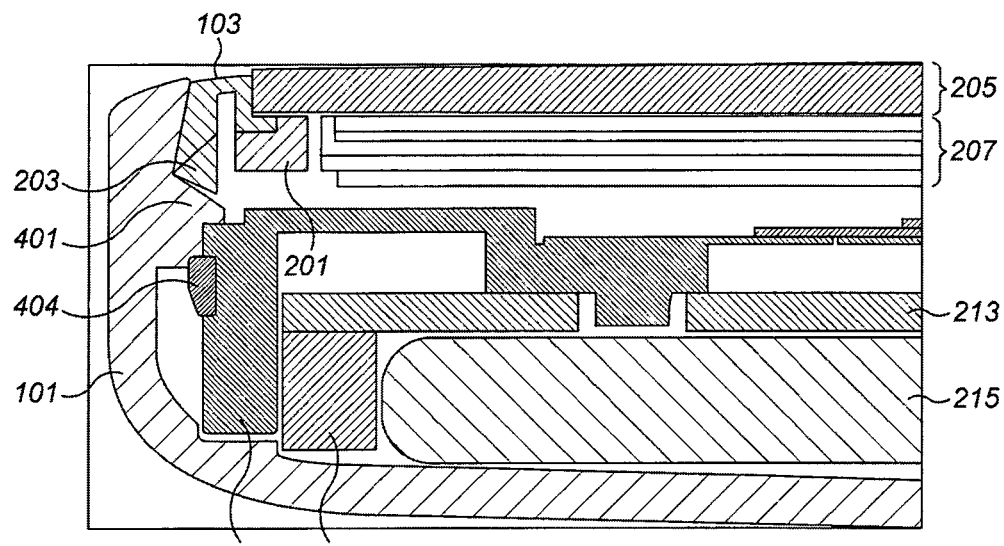
FIG. 5 shows schematically an example bellows suspension parts within an example apparatus.

With respect to FIGS. 4 and 5, an isolated cross sectional view of a further example of the bellows or folded surface suspension 301 and as shown in FIG. 5 the operation of the bellows suspension 301 operating in co-operation with the cover 101 and the window 205 is shown.

In the example shown in FIGS. 4 and 5 the bellows suspension 301 comprises the first support part 203 which forms a frame locating the folded surface part 103. In the examples shown in FIGS. 4 and 5 the first support part 203 can have a profiled section which tapers at one end to assist inserting the bellows suspension 301. Furthermore in some embodiments the first support part 203 can be profiled with a suitable co-operating surface relative to the cover 101 and/or chassis 211 or other part of the apparatus to lock the bellows suspension 301 first support part 203 into place and so locate it relative to the 'static' components of the apparatus.

For example as shown in FIG. 5 the cover 101 profiled inner portion 401 comprises a lip on which rests the first support part 203 of the bellows suspension 301. Furthermore the profiled inner portion of the cover 101 in some embodiments can be configured to fix the chassis 211 into position using a fixing feature 404. The chassis 211 in turn locks into position or locates the printed wiring board 213 and the battery chassis 403 locates the battery 215.

The bellows suspension second support part 201 further as shown in FIG. 5 locates the window 205.

The bellows suspension 301 as shown in FIGS. 4 and 5 can comprise a flexible folded surface part 103 configured to couple at one end the first support part 203 and couple at the other end the second support part 201 and be able to suspend the display by the bending forces within the flexible folding surface.

It would be understood that the number, direction and angle of the folds within the folded surface region can differ from embodiment to embodiment (and as shown here from example to example). For example the further example of the bellows suspension shown in FIGS. 4 and 5 shows the folded surface as a series of flat and folded surfaces rather than a continuously curved surface such as shown in FIG. 3. Thus, for example as shown in FIGS. 4 and 5, in some embodiments the folded surface part 103 comprises a first flat surface 321 which is coupled to the first support part 203 and is approximately in the vertical plane.

The first flat surface 321 is coupled to a first (approximately 90 degrees) fold 311 converting the surface from a vertical to approximately horizontal plane. The first fold 311 is shown coupled to a second flat surface 323 which is approximately horizontal. The second flat surface 323 is shown coupled to a second (approximately 90 degrees) fold 313 which is in the same direction as the first fold 311 and configured to convert the approximately horizontal plane to an approximately vertical plane. The second fold 313 is coupled to a third flat surface 325 which is approximately vertical and offset from the first flat surface 321 by the length of the second flat surface 323. The third flat surface is coupled to a third (approximately 90 degrees) fold 315 which is in the opposite direction to the first and second folds and configured to convert the surface from a vertical to approximately horizontal plane. The third fold 315 is further coupled to a fourth flat, surface 327 which is approximately horizontal and configured to couple to the second support part 201.

Furthermore although the folded surface can comprise a constant profile thickness along the folded surface part 103, for example as shown in FIG. 3, it would be understood that the folded surface can be configured to a varying profile thickness. For example as shown in FIGS. 4 and 5 the profile of the first surface 321 is such that the profile thickness increases towards the end of the part so to enable a locking fit to be made when the suspension is in place as shown in FIG. 5.

Figure 6:
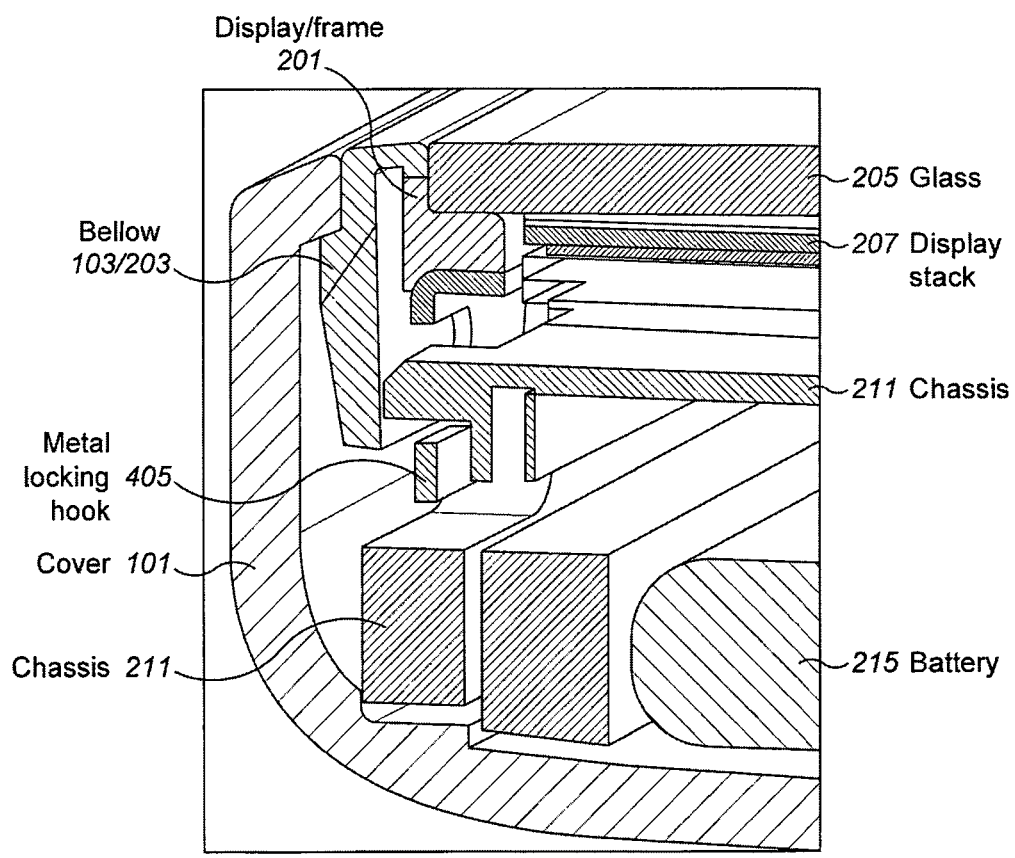
FIG. 6 shows schematically a further sectioned three dimensional view of an example bellows suspension according to some embodiments.

With respect to FIG. 6 a further cross-section three-dimensional view of an example apparatus operating a bellows suspension is shown wherein a metal locking hook 405 is shown locating the chassis 211 and in co-operation with the cover 101 inner profile locks into position the bellows suspension and in particular the first support part 203 and the folded surface part 103. The metal locking hook 405 is further shown with an upper surface located underneath the second support part 201 (or display frame) which forms an end stop defining the maximum vertical motion of the display assembly (the glass or window 205).

Figure 7:
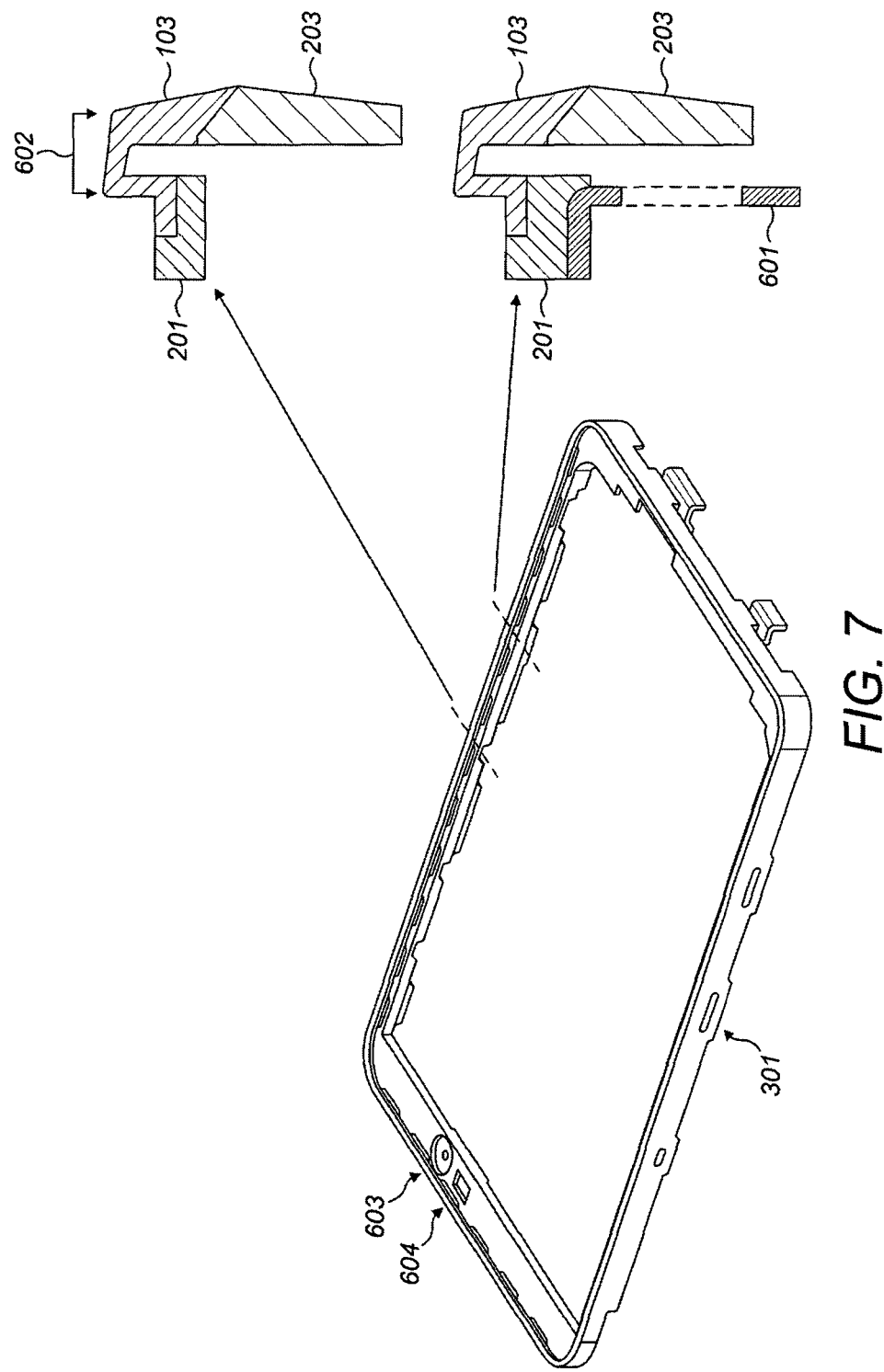
FIG. 7 shows schematically a three-dimensional view of an example bellows suspension according to some embodiments.

With respect to FIG. 7 a three-dimensional view and sectioned details of an example bellow suspension 301 assembly are shown. In the example shown in FIG. 7 the second support part 201 can form the display frame where the harder plastic ring forms a pad region within which can be couple to or glued to the display module. The second support part 201 can in some embodiments be shaped or machined so that there are ports or holes for internal components access to the front (or upper) face of the apparatus. For example FIG. 7 shows a camera lens opening 603 or aperture for a camera lens and an earpiece aperture 604 for an earpiece.

As shown in FIG. 7 the shape of the folded surface 103 can vary however the concept is to have a folded surface 103 visible area shown by the arrow 602 which is suitably narrow to reduce the dead zone.

It would be understood that in some embodiments as shown in FIG. 7 the suspension 301 can comprise inserts, such as metal inserts 601, coupled or bonded to the second support part 201. The inserts, which are effectively, coupled to the moving or dynamic portion of the suspension can be configured with openings which act as end stops and further locking or preventing the moving portion of the suspension from popping out if the apparatus is dropped.

Figure 8A:
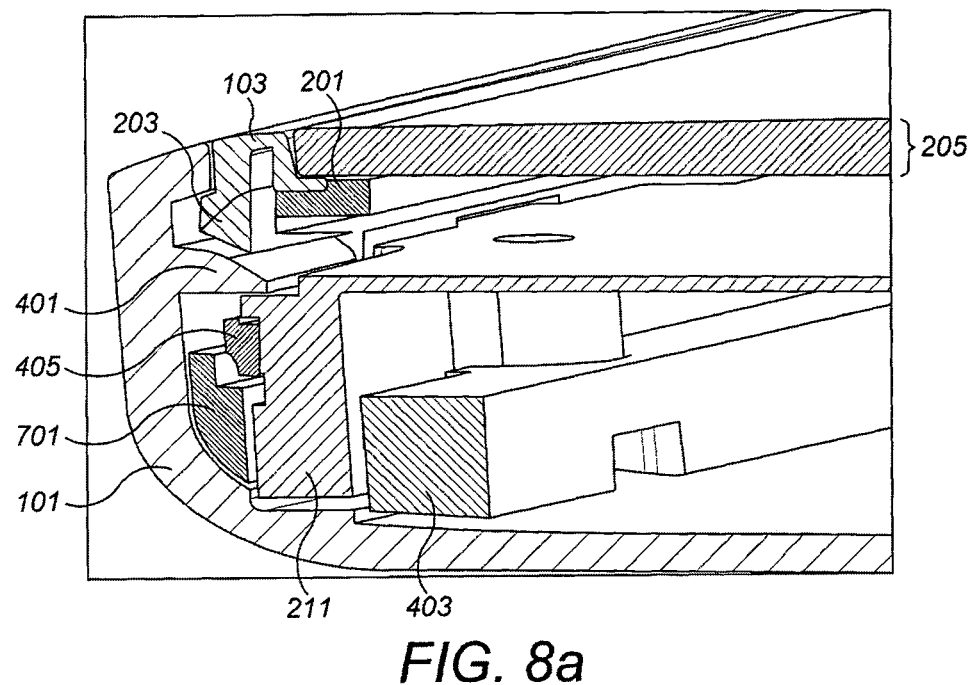
FIGS. 8a, 8b, and 8c show schematically three-dimensional views of further example bellows suspension according to some embodiments.
Figure 8B:
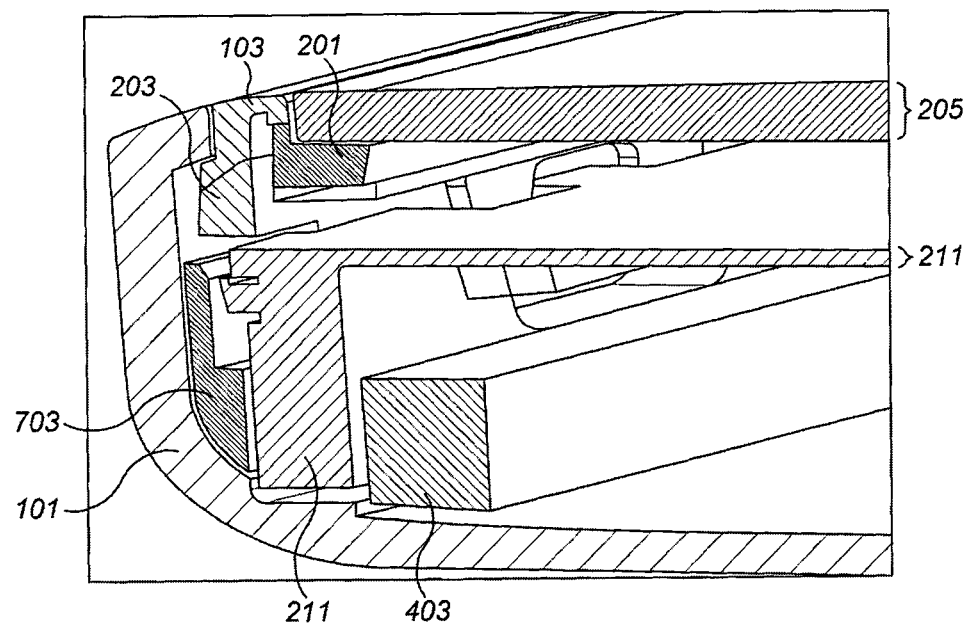
Figure 8C:
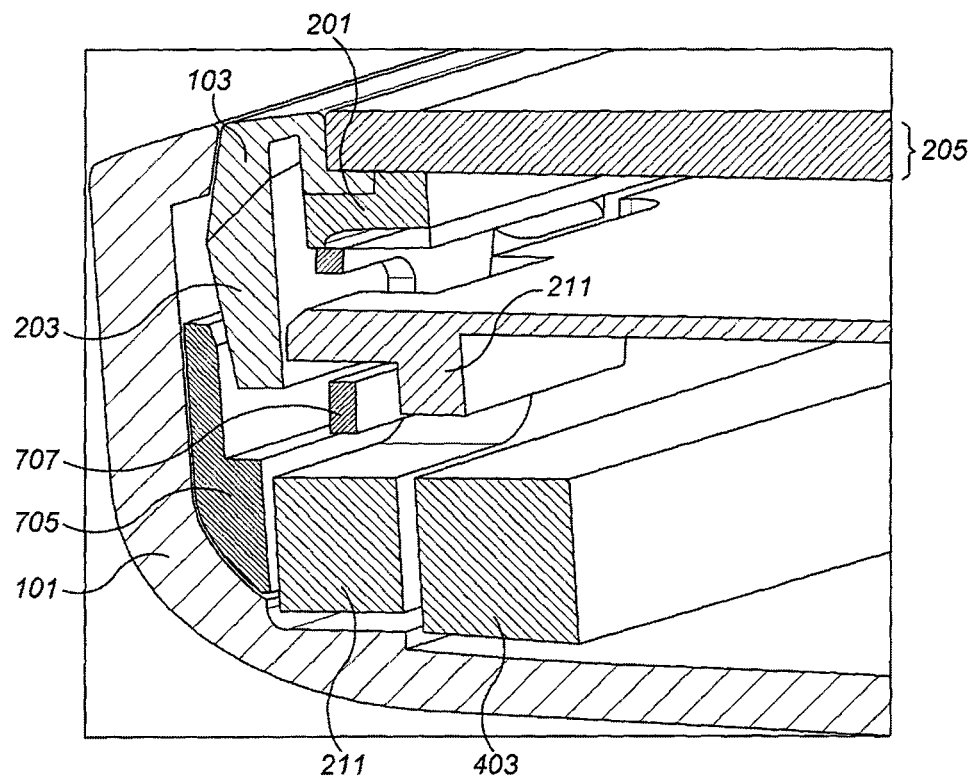

With respect to FIGS. 8a, 8b and 8c further three-dimensional views of example bellow suspensions are shown.

In FIG. 8a the chassis 211 is locked or located relative to the apparatus by the inner profile of the cover 401 and locking rings 405 and 701.

In FIG. 8b the chassis 211 is locked by locking ring 703.

In FIG. 8c locking rings 705 and 707 are shown.

Figure 9:
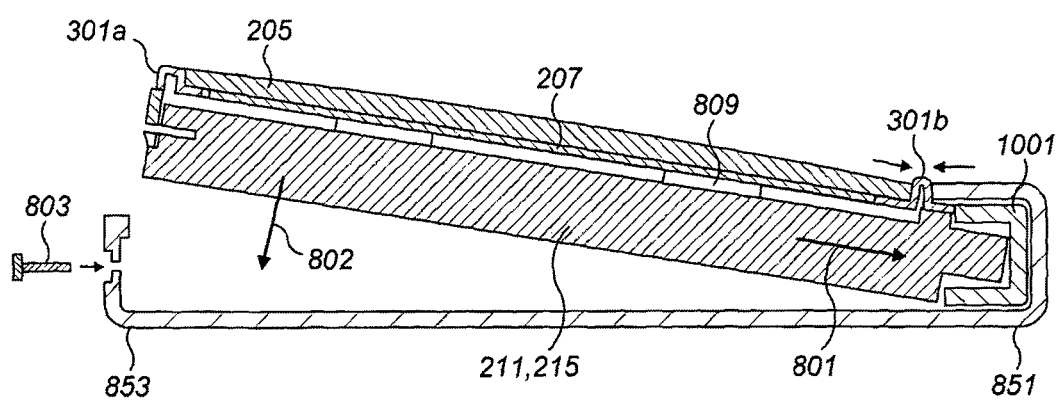
FIG. 9 shows schematically a 'side' view of an assembly system using an example bellows suspension in the construction of the apparatus.
Figure 10:
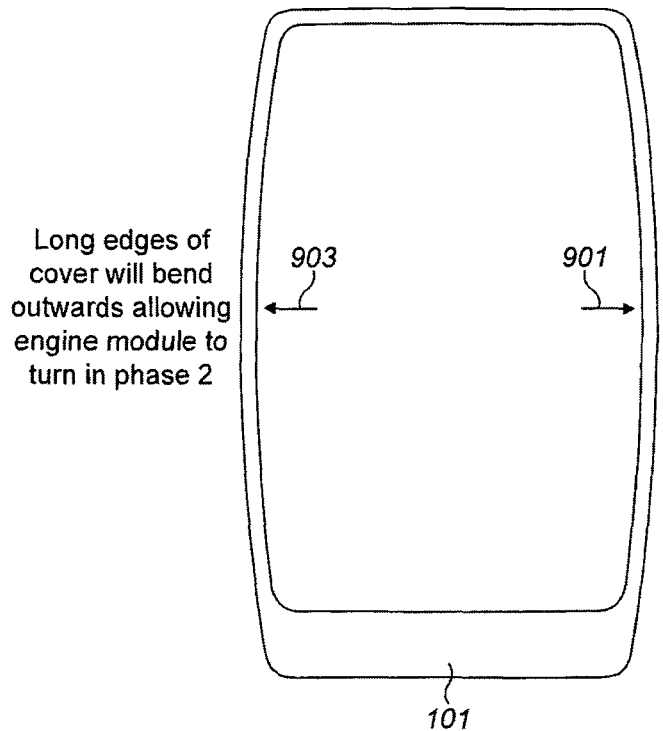
FIG. 10 shows schematically a 'front' view of the assembly system shown in FIG. 9.
Figure 11:
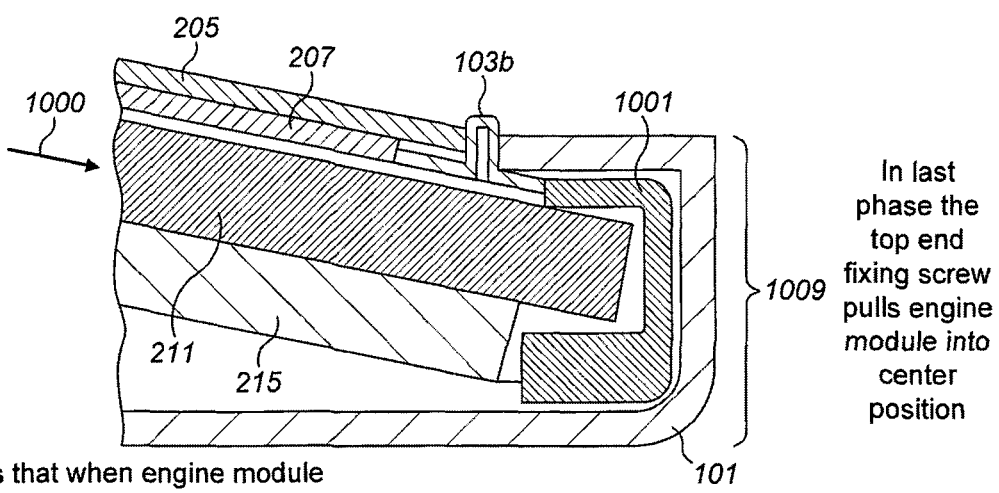
FIG. 11 shows schematically a detail of the 'side' view of the assembly system as shown in FIG. 9.

With respect to FIGS. 9, 10 and 11, the assembly of apparatus comprising audio display and bellows suspension as described herein is shown.

In the example shown in FIG. 9 the apparatus engine is shown being inserted into the casing or cover 101 of the apparatus. The apparatus engine in some embodiments comprises the bellows suspension 301, display window 205, the display 207, transducers 809 configured to dynamically move the display window 205, apparatus chassis 211 and battery 215. The bellows suspension 301 is shown with the bellows suspension first 'end' 301a which is similar to the example shown in FIG. 3 and a second 'end' 301b which shows a suspension first support part which is substantially in the same plane as the suspension second support part—in other words the suspension has two 'horizontal' support pad regions and a vertical folded surface between them.

The apparatus cover 101 in some embodiments is configured with an antenna module 1001 and side buttons internally located prior to the assembly of the engine module. It would be understood that in some embodiments there can be any number of pre-inserted components within the cover prior to the insertion of the apparatus engine. For example in some embodiments the camera module can be inserted and then coupled to the engine by the insertion process.

The display assembly can in some embodiments be inserted with the bellows suspension second 'end' into the cover 101 such that the apparatus engine is tilted so that one of the narrow sides of the bellows (and particularly) the first support part of the second 'end' is located under a cover 101 lip.

The pressure on the flexible surface at the second 'end' 301b effectively compresses the folds narrowing the long dimension of the display assembly such that it is less than the long dimension of the unibody hole.

This can be seen with respect to FIG. 11, where the engine module comprising the window 205, display 207, chassis 211 and battery 215 are pushed towards the second end 1009 of the cover. The second end of the cover can contain the antenna module & side buttons 1001. The force 1000 applied on the folded surface part 103b compresses or squeezes the folded surface narrowing itself sufficiently that the top end can be inserted under the lip of the top end of the unibody cover 101.

The insertion of the engine and pushing the 'first' end of the engine module into the cover is shown in FIG. 9 by step 801.

With respect to FIG. 10 a view of the cover is shown just after the display assembly has been inserted at one end. The unibody cover 101 is configured to have a degree of flexibility which when flexed along the long edge or dimension flexes the case so that the width of the unibody cover hole is greater than the width of the display module width dimension.

The display assembly can in such embodiments be then inserted into the unibody hole by tilting the apparatus engine 'first end' such that the first end suspension first support part clips under the cover 'first end'

The insertion of the 'first end' of the apparatus engine is shown in FIG. 9 by step 802.

The insertion of the first end of the apparatus engine into the cover hole then releases the force compressing the second end suspension causing the second end suspension 301b to relax and regain the suspension 'resting' dimension.

Furthermore in some embodiments the 'second end' of the apparatus engine module can be configured to receive a screw to pull the apparatus engine module into a centralised position enabling the floating display effect to be realised.

The operation of inserting a screw and pulling the engine module into a position is shown in FIG. 9 by step 803.

Although as shown the engine module or display assembly can be located with respect to a fixing member such as a screw co-operating with a hole in the suspension it would be understood that in some embodiments the display can be located by use of any suitable locating means, for example a flange or clip which can be configured to co-operated with the apparatus body.

It would be understood that in the examples discussed herein that a coupling or items coupled can be understood to be connected, attached, or fixed.

In some embodiments the bellows suspension comprises a formed folded surface which can operate as both the first and second support parts as well as provided the bending force to suspend the display relative to the casing or cover.

Furthermore in some embodiments the bellows suspension is located within the casing by locking mechanisms independent of the casing. In other words a separate locking means can be employed to lock or locate the bellows suspension and away from the cover.

In some embodiments the suspension and display assembly can be self locating when placed into a body, for example a unibody type apparatus body. For example in some embodiments the bellows suspension can be compressed to allow the display assembly with the suspension surrounding the display assembly in through the opening in one face of the unibody. When the display assembly is sufficiently inserted then the suspension compression force relaxes. The suspension relaxation allows the expansion of the suspension dimension which then is configured to locate the display assembly or at least the dynamic parts of the display assembly within the apparatus body. This type is insertion can be seen as a negative z-axis insertion with no tilting needed to insert the display below the undercut of the cover of the apparatus body.

Figure 12:
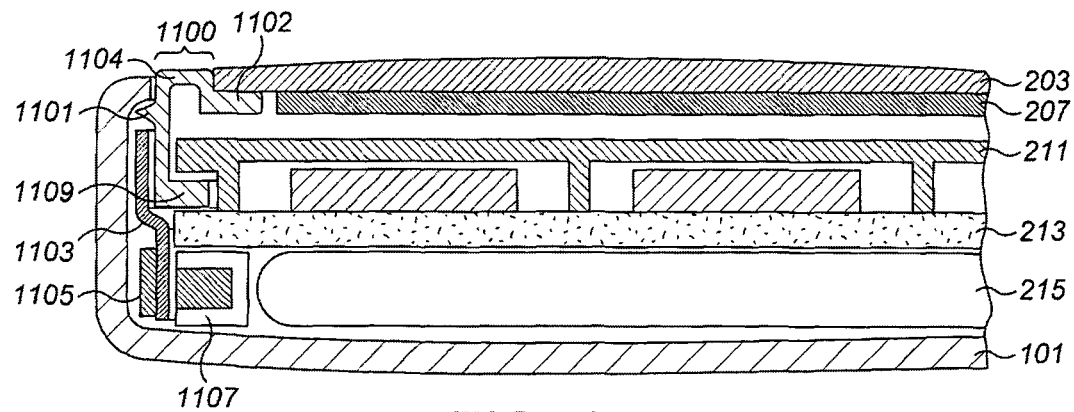
FIG. 12 shows schematically a sectional view of a further bellows suspension example.
Figure 13:
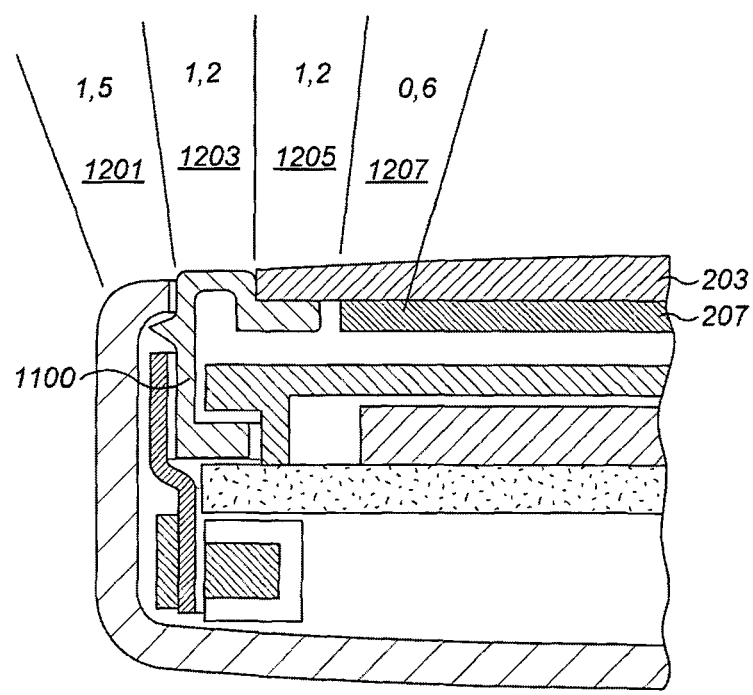
FIG. 13 shows schematically a sectional view detail of FIG. 12 demonstrating a 'dead zone' determination.

For example with respect to FIGS. 12 and 13 a further bellows suspension arrangement is shown where the bellows suspension is formed from a single part which is held in location by a locking ring which when in place surrounds and locates the bellows suspension.

As shown in FIG. 12 the cover 101 encloses a bellows suspension 1100. The bellows suspension differs from those described herein by being formed from a single material and having a profile with a lip 1109 configured to locate the static portion of the suspension relative to the chassis 211, printed wiring board 213 and a fixing or locking strip 1103. In some embodiments the suspension 1100 further has a profile with a step profile which is configured to be located under the cover lip and improve the location relative to the z-direction and improve sealing and rattling. The bellows suspension 1100 furthermore can comprise a folded surface part 1104 and a display support part 1102 configured to provide the bending force to support the display and furthermore to locate the display respectively in a manner similar to the folding surface part and second support parts described herein. In some embodiments the bellows suspension 1100 can be formed from silicone.

The locking or fixing strip 1103 can be a metal strip and furthermore in some embodiments be located within the cover by being screwed 1105 (or otherwise coupled) to the battery chassis 1107. It would be understood that the locking strip 1103 can in some embodiments be coupled to any substantive part of the apparatus. For example in some embodiments the strips can be inserted into a plastic part around the battery or the part which goes between the battery frame and printed wiring board. In some embodiments the strip can be plastic and be an extended portion of the battery frame. Furthermore in some embodiments the side buttons can be integrated into the metal strip components.

With respect to FIG. 13 an example of the estimated 'dead zone' surrounding the display with respect to the example apparatus shown in FIG. 12 is shown. The display 'dead zone' can be formed from the cover horizontal lip dimension 1201 (approx. 1.5 mm), the visible portion dimension of the bellows suspension 1203 (approx. 1.2 mm), the suspension pad dimension 1205 (approx. 1.2 mm) and the display gap 1207 dimension (approx. 0.6 mm). These dimensions therefore can according to some embodiments generate a dead band of approximately 4.5 mm which is significantly less than conventional touch interfaces.

Figure 14:
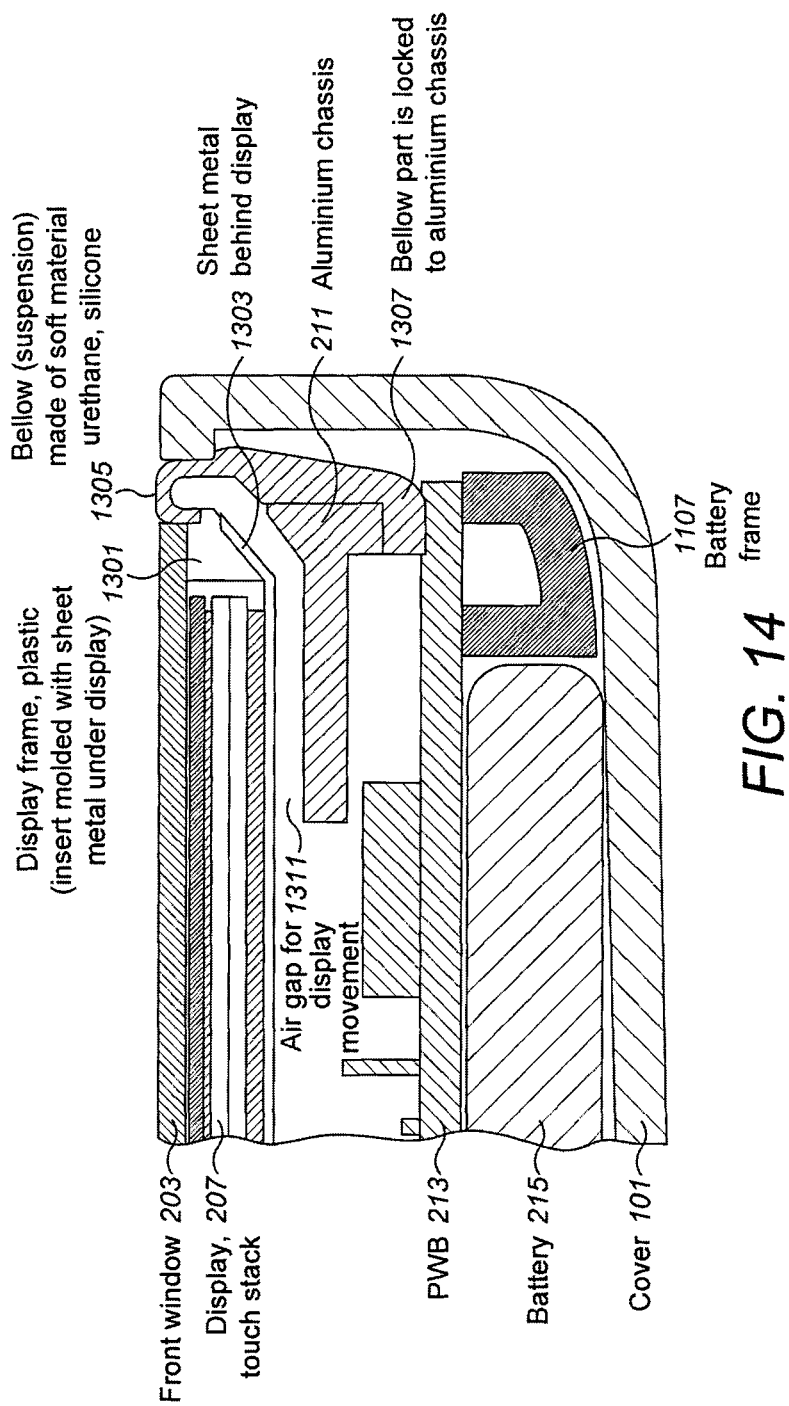
FIG. 14 shows schematically a sectional view detail of an example bellows suspension within an apparatus according to some embodiments.

With respect to FIG. 14 a further example of the bellows suspension in operation is shown. The bellows suspension configuration as shown in FIG. 14 differs from the embodiments described herein in that the suspension ring of the bellows suspension is replaced by a combination of display frame and sheet display support. Furthermore in some embodiments the use of the sheet display support allows the apparatus to remove the metal locking hook configured to lock the display and therefore prevent the display from separating from the apparatus cover completely.

Figure 15:
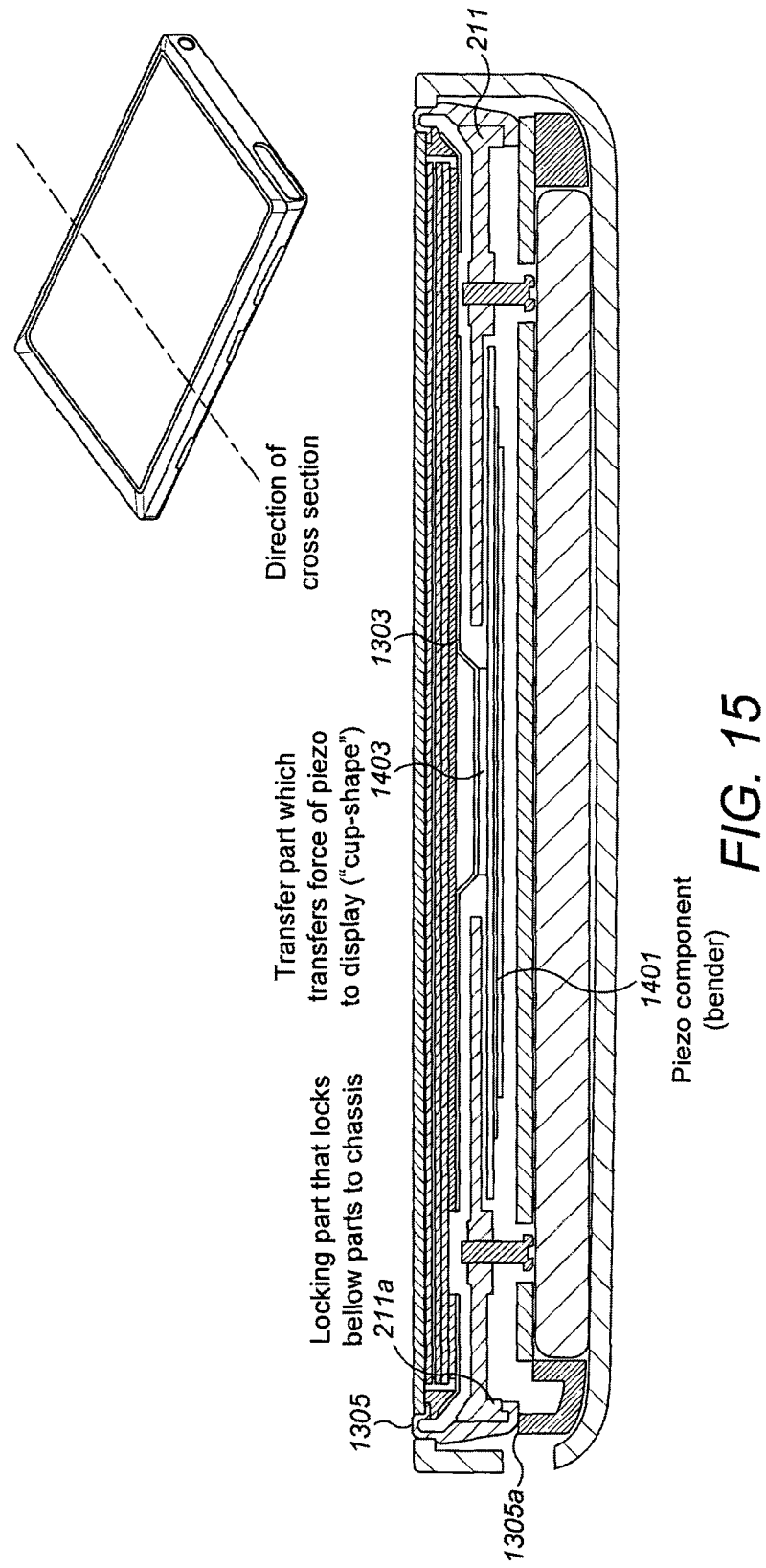
FIG. 15 shows schematically a further sectional view of an example bellows suspension as shown in FIG. 14.

In the example shown in FIG. 14 the display is supported and coupled to the suspension by a display frame 1301 within which the display assembly is located. For example as shown in FIG. 15 the display frame is an insert moulded plastic which can be glued along a top surface to the front window 203, glued to an outer surface to the bellows suspension 1305 and glued to an under surface to a sheet or support sheet. In such embodiments the sheet or support sheet 1303 is a shaped (for example stamped or bent sheet of metal) sheet underneath the display and touch stack 207. In other words the display assembly can be in some embodiments protected from underneath (or supported from underneath) by the support sheet 1303.

In the example shown in FIG. 14 the bellows suspension 1305 comprises a shaped or bent profiled soft material such as urethane or silicone. The bellows suspension 1305 can in some embodiments, and as described herein, be formed with a variable profile. For example the bent or suspension part coupling the display side and body side parts of the suspension can be configured to have a substantially consistent profile or thickness providing when bent an expected degree of flexibility and resilience. Furthermore the body side part of the suspension can be configured with a variable profile or thickness configured to enable the bellows suspension to locate and fix the suspension underneath the cover 101 and particularly underneath the cover lip. Furthermore in some embodiments the body side part of the suspension can be configured with a profile lip 1307 configured to fit between the chassis 211 and the printed wiring board 213 and lock the suspension to the chassis 211.

In some embodiments the chassis 211, which in the embodiments shown in FIG. 14 is an aluminium chassis 211, can be configured with a co-operating lip profiled to lock the bellows suspension lip 1307 between the chassis and the printed wiring board 213.

Furthermore, as shown in FIG. 14, the chassis can be profiled to create an air gap 1311 between the rear of the sheet metal 1303 underneath the display and the chassis 211 enabling the display to move within a defined region.

As shown in FIG. 14 the printed wiring board 213 furthermore can be located relative to the cover 101 by the chassis 211 and a battery frame 1107 which further locates the battery 215.

With respect to FIG. 15 a further view of the bellows suspension configuration as shown in FIG. 14 is shown. In the example shown in FIG. 15 the cross-sectional view shows the location of the piezo component 1401 coupled to the chassis 211 at either end of the piezo component 1401 and coupled at the central region of the piezo component 1401 to a transfer part 1403 configured to transfer the force of the bending of the piezo component to the display. In the example shown in FIG. 15 the transfer part 1403 is coupled to a 'cup-shape' section of the sheet metal 1303 behind the display such that the user component transfers force via the transfer part 1403 to the display via the sheet metal 1303.

Furthermore as shown in FIG. 15 in some embodiments the chassis 211 comprises a locking part 211*a* which has a defined profile configured to lock to a cooperating bellows locking part 1305*a* of the bellows suspension 1305. In some embodiments the bellows suspension can be located on one side between the printed wiring board and the chassis 211 and located on the other side by the cooperating profile parts or locking parts of the chassis locking part 211*a* and the bellows locking part 1305*a*.

Figure 16:
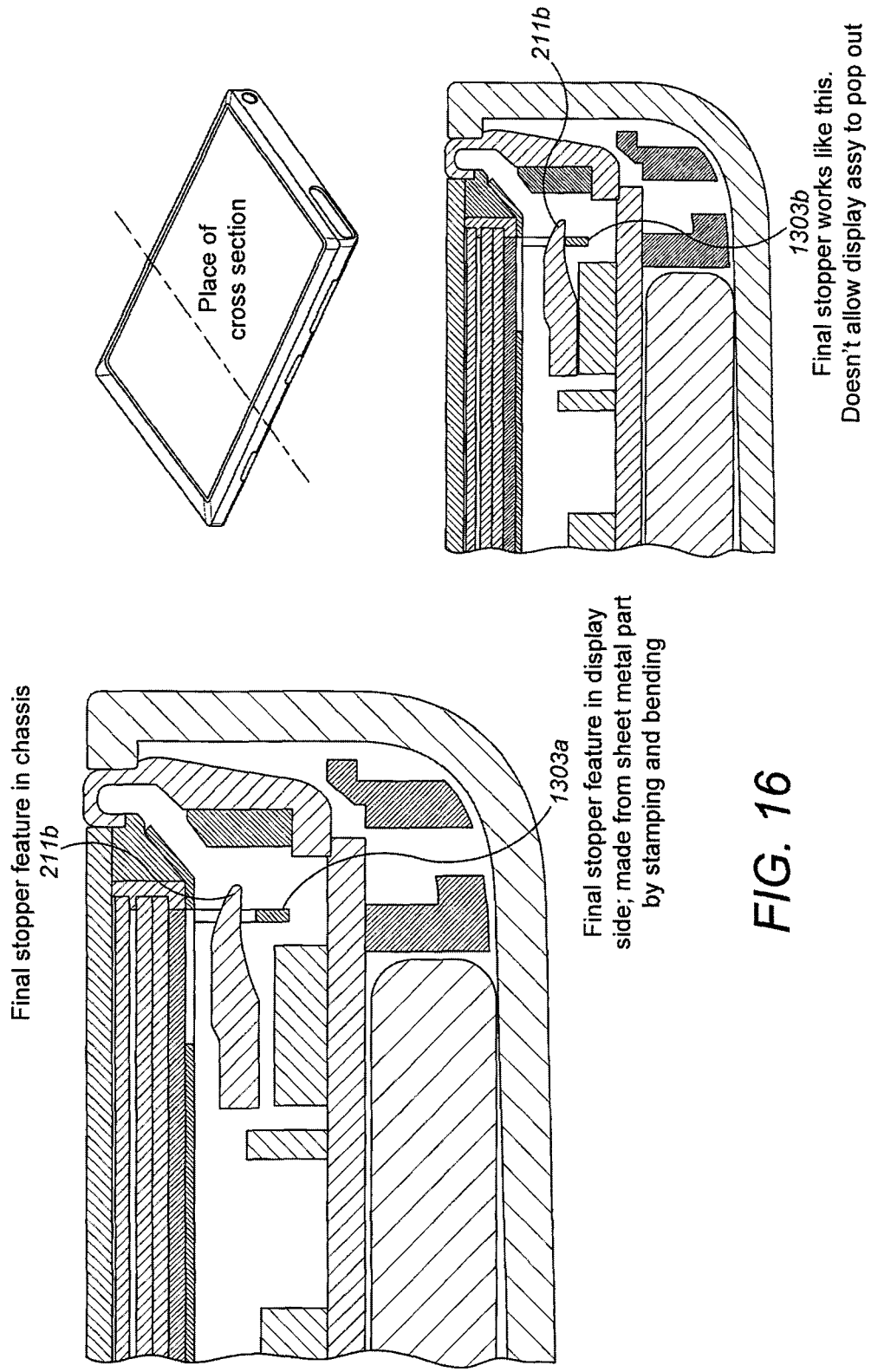
FIG. 16 shows schematically a further sectional view detail of the example bellows suspension as shown in FIGS. 14 and 15.

With respect to FIG. 16 a further sectional view of the bellows suspension shows the implementation of a dynamic lock producing a mechanical stop of the display. In some embodiments the sheet metal or sheet 1303 is configured with a stamped and bent part which forms a display stop 1303*a*. The display stop 1303*a* can be shaped such that the chassis 211 passes through the hole between the sheet and display stop 1303*a* so that the motion of the display is limited by the display stop 1303*a* in an upper direction by the chassis stop 211*b* and in a lower direction by the printed wiring board. The operation of the display stopper 1303*a* is shown in FIG. 16 where at rest the display stop 1303*a* is located beneath the chassis stop 211*b*, however when the display rises the sheet stop 1303*b* abuts against the chassis stop 211*b* thus preventing any further motion in a 'upwards' direction.

It shall be appreciated that the term user equipment is intended to cover any suitable type of wireless user equipment, such as mobile telephones, portable data processing devices or portable web browsers. Furthermore, it will be understood that the term acoustic sound channels is intended to cover sound outlets, channels and cavities, and that such sound channels may be formed integrally with the transducer, or as part of the mechanical integration of the transducer with the device.

In general, the design of various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The design of embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory used in the design of embodiments of the application may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be designed by various components such as integrated circuit modules.

As used in this application, the term 'circuitry' refers to all of the following:
 (a) hardware-only circuit implementations (such as implementations in only analog and/or digital circuitry) and
 (b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and
 (c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims.

However, all such and similar modifications of the teachings of this invention will still fall within the scope of this invention as defined in the appended claims.

The invention claimed is:

1. An apparatus for providing a suspension comprising:
 a first support part configured to be coupled to a part of a device;
 a second support part configured to be coupled to a display of the device; and
 a flexible suspension part coupled at one end to the first support part and at another end to the second support part, wherein the flexible suspension part comprises a resilient folded surface, and wherein the suspension is configured to suspend the display such that the display is movable relative to the part of the device.

2. The apparatus for providing a suspension as claimed in claim 1, wherein the first support part and the flexible suspension part are integrally formed.

3. The apparatus for providing a suspension as claimed in claim 1, wherein the second support part and the flexible suspension part are integrally formed.

4. The apparatus for providing a suspension as claimed in claim 1, wherein the second support part comprises a display frame for the display.

5. The apparatus for providing a suspension as claimed in claim 1, wherein the flexible suspension part is configured to suspend the second support part relative to the first support part with a bending force of the resilient folded surface.

6. The apparatus for providing a suspension as claimed in claim 1, wherein the resilient folded surface is at least one of:
 a urethane layer;
 a plastic layer;
 a rubber layer; or
 a silicone layer.

7. The apparatus for providing a suspension as claimed in claim 1, wherein a compressible direction of the resilient folded surface permits the display suspension to be inserted within a housing of the device.

8. The apparatus for providing a suspension as claimed in claim 1, wherein the resilient folded surface, when inserted within a housing of the device, is configured to relax in a direction substantially perpendicular to at least one fold of the resilient folded surface.

9. The apparatus for providing a suspension as claimed in claim 1, wherein the display is an audio display configured to generate at least one acoustic sound with motion of the display relative to the part of the device.

10. The apparatus for providing a suspension as claimed in claim 1, wherein the flexible suspension part is coupled at one end to the first support part and at an opposite end to the second support part.

11. The apparatus for providing a suspension as claimed in claim 1, wherein the flexible suspension part comprises a variable profile or thickness.

12. The apparatus for providing a suspension as claimed in claim 1 further comprising a support sheet.

13. The apparatus for providing a suspension as claimed in claim 1 wherein the resilient folded surface is configured to be compressible in a direction substantially perpendicular to at least one fold in the resilient folded surface.

14. The apparatus for providing a suspension as claimed in claim 13 wherein the resilient folded surface at least partially surrounds the display and permits the display to be inserted within a housing of the device.

15. The apparatus for providing a suspension as claimed in claim 1 wherein the resilient folded surface comprises a first fold and a second fold.

16. The apparatus for providing a suspension as claimed in claim 15 wherein the first fold is between the first support part the flexible suspension part, and wherein the second fold is between the second support part and the flexible suspension part.

17. The apparatus for providing a suspension as claimed in claim 16 wherein the first and second folds are configured to be proximate an exterior of the device.

\* \* \* \* \*